US011686119B1

(12) United States Patent
Huang (10) Patent No.: US 11,686,119 B1
(45) Date of Patent: Jun. 27, 2023

(54) TENT TRAILER AND VEHICLE (71) Applicant: William Huang, Nanchang (CN)

(72) Inventor: William Huang, Nanchang (CN)

(*) Notice: Subject to any disclaimer, the term of this patent is extended or adjusted under 35 U.S.C. 154(b) by 0 days.

(21) Appl. No.: 17/948,255

(22) Filed: Sep. 20, 2022

(30) Foreign Application Priority Data

Aug. 31, 2022 (CN) ......................... 202222310031.X (51) Int. Cl.
| *E04H 15/06* | (2006.01) |
| *E04H 15/48* | (2006.01) |
| *B62K 27/00* | (2006.01) |
| *B60P 3/34* | (2006.01) |
| *E04H 15/56* | (2006.01) |
| *E04H 15/42* | (2006.01) |

(52) U.S. Cl.
CPC ............. *E04H 15/06* (2013.01); *B60P 3/341* (2013.01); *B62K 27/003* (2013.01); *E04H 15/48* (2013.01); *E04H 15/56* (2013.01); *E04H 15/42* (2013.01)

(58) Field of Classification Search
CPC ......... B60P 3/341; E04H 15/06; E04H 15/44; E04H 15/48
See application file for complete search history.

(56) References Cited

U.S. PATENT DOCUMENTS

| 947,472 | A | * | 1/1910 | Lehmann | ............... | A47C 17/64 |
| | | | | | | 135/96 |
| 3,584,322 | A | * | 6/1971 | McDougall | .......... | A47C 29/006 |
| | | | | | | 135/96 |
| 5,020,814 | A | * | 6/1991 | George | ................ | B62K 27/003 |
| | | | | | | 280/401 |
| 5,054,800 | A | * | 10/1991 | Christensen | ......... | B62K 27/003 |
| | | | | | | 280/204 |
| 5,449,014 | A | * | 9/1995 | Yan-ho | ................ | A47C 29/003 |
| | | | | | | 135/95 |
| 5,785,333 | A | * | 7/1998 | Hinkston | ............... | B62K 27/16 |
| | | | | | | 280/647 |
| 5,785,334 | A | * | 7/1998 | Robinson | ............. | B62K 27/003 |
| | | | | | | 280/42 |
| 5,829,771 | A | * | 11/1998 | Hsu | ...................... | B62K 27/003 |
| | | | | | | 280/204 |
| 5,979,921 | A | * | 11/1999 | Derven | ................ | B62K 15/006 |
| | | | | | | 280/491.1 |
| 11,464,202 | B2 | * | 10/2022 | Lopez | ................... | A01K 1/0281 |
| 2006/0266399 | A1 | * | 11/2006 | Ferrari | .................... | E04H 15/38 |
| | | | | | | 135/96 |

* cited by examiner

*Primary Examiner* — Noah Chandler Hawk (57) ABSTRACT

The present disclosure provides a tent trailer and a vehicle, the tent trailer is capable of being connected with the vehicle to move with the vehicle. The tent trailer includes a tent assembly, a wheel assembly having two opposite wheels, and a connecting assembly. The tent assembly is arranged on the connecting assembly. The connecting assembly includes a first connecting member arranged between the two opposite wheels, and two opposite connecting shafts, two ends of each of the connecting shafts are respectively connected with one corresponding wheel and one corresponding one of the first connecting member, so as to connect the wheels with the first connecting member, and the vehicle is connected with the first connecting member to drive the tent trailer to move. The vehicle of the present disclosure has multiple functions and is convenient to use.

14 Claims, 8 Drawing Sheets

TENT TRAILER AND VEHICLE

FIELD

The present disclosure relates to the technical field of vehicles, specifically to a tent trailer, and a vehicle.

BACKGROUND

People often go out by bikes. However, the existing vehicles, such as bicycles, and motorbikes, do not provide a space for people to rest. Therefore, it is necessary to provide a new tent trailer to solve the above problem.

SUMMARY

In view of the above-mentioned defects of the prior art, the present disclosure provides a tent trailer and a vehicle, the vehicle has multiple functions and is convenient to use.

To achieve the above purpose, the present disclosure provides a tent trailer, capable of being connected with a vehicle to move with the vehicle, the tent trailer includes: a tent assembly, a wheel assembly having two opposite wheels, and a connecting assembly, the tent assembly is arranged on the connecting assembly, and the connecting assembly includes a first connecting member arranged between the two opposite wheels, and two opposite connecting shafts, two ends of each of the connecting shafts are respectively connected with one corresponding wheel and one corresponding side of the first connecting member, so as to connect the wheels with the first connecting member, and the vehicle is connected with the first connecting member to drive the tent trailer to move.

In at least one embodiment, the first connecting member is a connecting frame, and a gap is defined between the wheel and the connecting frame to prevent the tent assembly from getting stuck in the wheel, and the gap is defined along an extending direction of the connecting shaft, a length of the gap is 2-6 cm.

In at least one embodiment, the connecting assembly further includes: two opposite sleeves, each of the sleeves is sleeved on one corresponding connecting shaft and arranged between the connecting frame and the wheel, so as to define the gap between the wheel and the connecting frame.

In at least one embodiment, the connecting frame includes: two opposite side frames, two ends of each of the connecting shafts are respectively connected with one corresponding wheel and one corresponding side frame, and the gap is defined between the side frame and the wheel.

In at least one embodiment, the connecting assembly further includes: a connecting rod, two ends of the connecting rod are respectively connected with the two opposite side frames, the side frame defines a first through hole, and the connecting shaft is connected with the connecting rod after passing through the wheel and the first through hole.

In at least one embodiment, the connecting shaft defines at least one second through hole; the connecting rod defines at least one third through hole; and the connecting assembly further includes at least one second connecting member, the second through hole is communicated with the third through hole when the connecting shaft passes through the first through hole and inserted into the connecting rod, and the second connecting member is received in the second through hole and the third through hole, to connect the connecting rod with the connecting shaft.

In at least one embodiment, the first connecting member is a connecting rod, and two ends of each of the connecting shafts are respectively connected with one corresponding wheel and one corresponding side of the connecting rod.

In at least one embodiment, the connecting assembly further includes: two opposite sleeves, each of the sleeves is sleeved on one corresponding connecting shaft and arranged between the connecting rod and the wheel, and two end walls of each of the sleeves are respectively retained against the connecting rod and the wheel, so as to define a gap is between the connecting rod and the wheel, the gap is defined along an extending direction of the connecting shaft, and a length of the gap is 2-6 cm.

In at least one embodiment, the tent assembly includes: a tent body, a bottom pad, connected with the tent body, a first support frame, configured for supporting the tent body, and a second support frame, configured for supporting the bottom pad, the first support frame is rotatably connected with the second support frame, the second support frame is connected with the first connecting member, when the tent assembly is in an unfolded state, the first support frame and the second support frame are connected at an included angle to support the tent body; and when the tent assembly is in a folded state, the first support frame is stacked on the second support frame.

In at least one embodiment, the second support frame includes a first sub-support frame connected with the first connecting member, and a second sub-support frame rotatably connected with the first sub-support frame, when the tent assembly is in the unfolded state, the first sub-support frame and the second sub-support frame are connected at an included angle to support the tent body; and when the tent assembly is in the folded state, the first sub-support frame is stacked on the second sub-support frame; and/or the tent assembly further includes at least one third connecting member, and the first support frame is rotatably connected with the second support frame by the third connecting member; and/or the connecting assembly further includes at least one fourth connecting member, and the second support frame is connected with the first connecting member by the fourth connecting member; and/or the connecting assembly further includes a bending rod, one end of the bending rod is connected with the second support frame, and another end of the bending rod is connected with the vehicle.

The present disclosure further provides a vehicle, including a vehicle body and the tent trailer as described above, the tent trailer is connected with the vehicle body.

In at least one embodiment, the first connecting member is a connecting frame, and a gap is defined between the wheel and the connecting frame to prevent the tent assembly from getting stuck in the wheel, and the gap is defined along an extending direction of the connecting shaft, a length of the gap is 2-6 cm.

In at least one embodiment, the connecting assembly further includes: two opposite sleeves, each of the sleeves is sleeved on one corresponding connecting shaft and arranged between the connecting frame and the wheel, so as to define the gap between the wheel and the connecting frame.

In at least one embodiment, the connecting frame includes: two opposite side frames, two ends of each of the connecting shafts are respectively connected with one corresponding wheel and one corresponding side frame, and the gap is defined between the side frame and the wheel.

In at least one embodiment, the connecting assembly further includes: a connecting rod, two ends of the connecting rod are respectively connected with the two opposite side frames, the side frame defines a first through hole, and the connecting shaft is connected with the connecting rod after passing through the wheel and the first through hole.

In at least one embodiment, the connecting shaft defines at least one second through hole; the connecting rod defines at least one third through hole; and the connecting assembly further includes at least one second connecting member, the second through hole is communicated with the third through hole when the connecting shaft passes through the first through hole and inserted into the connecting rod, and the second connecting member is received in the second through hole and the third through hole, to connect the connecting rod with the connecting shaft.

In at least one embodiment, the first connecting member is a connecting rod, and two ends of each of the connecting shafts are respectively connected with one corresponding wheel and one corresponding side of the connecting rod.

In at least one embodiment, the connecting assembly further includes: two opposite sleeves, each of the sleeves is sleeved on one corresponding connecting shaft and arranged between the connecting rod and the wheel, and two end walls of each of the sleeves are respectively retained against the connecting rod and the wheel, so as to define a gap is between the connecting rod and the wheel, the gap is defined along an extending direction of the connecting shaft, and a length of the gap is 2-6 cm.

In at least one embodiment, the tent assembly includes a tent body, a bottom pad, connected with the tent body, a first support frame, configured for supporting the tent body, and a second support frame, configured for supporting the bottom pad, the first support frame is rotatably connected with the second support frame, the second support frame is connected with the first connecting member, when the tent assembly is in an unfolded state, the first support frame and the second support frame are connected at an included angle to support the tent body; and when the tent assembly is in a folded state, the first support frame is stacked on the second support frame.

In at least one embodiment, the second support frame includes a first sub-support frame connected with the first connecting member, and a second sub-support frame rotatably connected with the first sub-support frame, when the tent assembly is in the unfolded state, the first sub-support frame and the second sub-support frame are connected at an included angle to support the tent body; and when the tent assembly is in the folded state, the first sub-support frame is stacked on the second sub-support frame; and/or the tent assembly further includes at least one third connecting member, and the first support frame is rotatably connected with the second support frame by the third connecting member; and/or the connecting assembly further includes at least one fourth connecting member, and the second support frame is connected with the first connecting member by the fourth connecting member; and/or the connecting assembly further includes a bending rod, one end of the bending rod is connected with the second support frame, and another end of the bending rod is connected with the vehicle.

In the technical solution of the present disclosure, the tent trailer includes the tent assembly, the wheel assembly, and the connecting assembly. The wheel assembly includes two oppositely arranged wheels. The tent assembly is arranged on the connecting assembly. The connecting assembly includes the connecting frame and two connecting shafts disposed opposite to each other. The connecting frame is located between the two oppositely arranged wheels. Both ends of each connecting shaft are respectively connected with one corresponding wheel and one corresponding side of the connecting frame, so as to connect the wheel with the connecting frame, the vehicle is connected with the connecting frame, so the vehicle can drive the tent trailer to move. When going out, the tent trailer can move with the vehicle, and when it is necessary to rest, the tent assembly can be unfolded to provide a space for people to rest. Since the tent assembly can be dragged by the vehicle, there is no need to carry a tent, so that the vehicle applying the tent trailer has multiple functions and is convenient to use. Moreover, the tent assembly can be set off the ground since the tent assembly is disposed on the connecting assembly, and the tent assembly will not be affected by the terrain. Therefore, the tent assembly can be used in rainy days, and can be used on waterlogged areas, stones, sandy ground, and other different scenarios, further the tent assembly can protect people from mosquitoes.

BRIEF DESCRIPTION OF THE DRAWINGS

Implementations of the present disclosure will now be described, by way of embodiment, with reference to the attached FIG.s. It should be understood, the drawings are shown for illustrative purpose only, for ordinary person skilled in the art, other drawings obtained from these drawings without paying creative labor by an ordinary person skilled in the art should be within scope of the present disclosure.

The realization of the aim, functional characteristics, advantages of the present disclosure are further described specifically with reference to the accompanying drawings and embodiments.

DETAILED DESCRIPTION

It will be appreciated that for simplicity and clarity of illustration, where appropriate, reference numerals have been repeated among the different FIG.s to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion in the so-described combination, group, series, and the like. the present disclosure is illustrated by way of example and not by way of limitation in the FIG.s of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Please referring to FIGS. 1 to 9, the present disclosure provides a tent trailer 10a that can be connected with a vehicle 200 and move with the vehicle 200.

The tent trailer 100 includes a tent assembly 10, a wheel assembly 20, and a connecting assembly 30. The wheel assembly 20 includes two oppositely arranged wheels 21. The tent assembly 10 is arranged on the connecting assembly 30. The connecting assembly 30 includes a first connecting member, and two connecting shafts 33 disposed opposite to each other. Both ends of each connecting shaft 33 are respectively connected with one corresponding wheel 21 and one corresponding side of the first connecting member, so as to connect the wheel 21 with the first connecting member. The vehicle 200 is connected with the first connecting member, so the vehicle 200 can drive the tent trailer 100 to move.

In at least one embodiment, the first connecting member is a connecting frame 31, and a gap 313 (referring to FIG. 4) is defined between the wheel 21 and the connecting frame 31, to prevent the tent assembly 10 from getting stuck in the wheel 21. The gap 313 is defined along an extending direction of the connecting shaft 33, and a length of the gap 313 is 2-6 cm. For example, the length of the gap 313 is 2 cm, 3 cm, 4 cm, 5 cm, or 6 cm. The connecting assembly 30 further includes a connecting rod 32, two ends of the connecting rod 32 are respectively connected with the two opposite side frames 311. After the connecting shaft 33 passes through the wheel 21 and a first through hole 3111 of the connecting frame 31, the connecting shaft 33 is connected with the connecting rod 32. The connecting shaft 33 and/or the connecting rod 32 can be supported by the side frame 311 to improve a connection strength between the connecting shaft 33 and the connecting rod 32.

In at least one embodiment, the gap 313 is defined between a hub 211 of the vehicle 200 and the connecting frame 31.

In at least one embodiment, the connecting frame 31 is U-shaped. The connecting frame 31 includes two opposite side frames 311 and a bottom frame 312 connected with the two side frames 311. The side frame 311 defines the first through hole 3111. Both ends of each connecting shaft 33 are respectively connected with one corresponding wheel 21 and one corresponding side frame 311, and the gap 313 is defined between the side frame 313 and the hub 211 of the wheel 21.

In another embodiment, the connecting frame 31 can also be square shaped, ellipsoidal shaped, trapezoidal shaped, or irregular shaped.

In at least one embodiment, the connecting rod 32 has a hollow structure, so that the connecting shaft 33 can extend into the connecting rod 32.

In at least one embodiment, the connecting shaft 33 is detachably connected with the wheel 21, the connecting frame 31, and the connecting rod 32.

In at least one embodiment, the tent assembly 10 is foldable, and the tent assembly 10 has a smaller volume when folded, so that the vehicle 200 can drag the tent trailer 100 easily.

In at least one embodiment, the tent assembly 10 is waterproof.

In at least one embodiment, the tent assembly 10 includes at least one foldable leg 15. When in use, the leg 15 can be used to support the tent assembly 10. The legs 15 can be folded when the tent trailer 100 moves with the vehicle 200.

In at least one embodiment, a height of the leg 15 is not less than a distance between a center of the hub 211 of the wheel 21 and the ground. In other words, the height of the leg 15 is not less than a radius of the wheel 21.

In at least one embodiment, the wheel 21 includes the hub 211, the hub 211 defines a mounting hole 2111, one end of the connecting shaft 33 is provided with a blocking member 332. The blocking member 332 is limited at a periphery of the mounting hole 2111 after the connecting shaft 33 passes through the mounting hole 2111.

In the technical solution of the present disclosure, the tent trailer 100 includes the tent assembly 10, the wheel assembly 20, and the connecting assembly 30. The wheel assembly 20 includes two oppositely arranged wheels 21. The tent assembly 10 is arranged on the connecting assembly 30. The connecting assembly 30 includes the connecting frame 31 and two connecting shafts 33 disposed opposite to each other. The connecting frame 31 is located between the two oppositely arranged wheels 21. Both ends of each connecting shaft 33 are respectively connected with one corresponding wheel 21 and one corresponding side of the connecting frame 31, so as to connect the wheel 21 with the connecting frame 31, the vehicle 200 is connected with the connecting frame, so the vehicle 200 can drive the tent trailer 100 to move. When going out, the tent trailer 100 can move with the vehicle 200, and when it is necessary to rest, the tent assembly 10 can be unfolded to provide a space for people to rest. Since the tent assembly 10 can be dragged by the vehicle 200, there is no need to carry a tent, so that the vehicle 200 applying the tent trailer 100 has multiple functions and is convenient to use. Moreover, the tent assembly 10 can be set off the ground since the tent assembly 10 is disposed on the connecting assembly 30, and the tent assembly 10 will not be affected by the terrain. Therefore, the tent assembly 10 can be used in rainy days, and can be used on waterlogged areas, stones, sandy ground, and other different scenarios, further the tent assembly 10 can protect people from mosquitoes.

The connecting assembly 30 includes two oppositely disposed sleeves 34, each sleeve 34 is sleeved on one corresponding connecting shaft 33 and is located between the connecting frame 31 and the wheel 21, so as to define the gap 313 between the wheel 21 and the connecting frame 31.

It should be understood that, the connecting shaft 33 is not completely received in the mounting hole 2111 of the wheel 21 and the first through hole 3111 of the connecting frame 31, so the gap 313 can be defined between the wheel 21 and the connecting frame 31 without the sleeve 34.

In at least one embodiment, a cross section of the sleeve 34 is circular shaped, oval shaped, polygonal shaped, or irregular shaped.

It can be understood that a length of the sleeve 34 is consistent with the length of the gap 313. Or, a length of the sleeve 34 is slightly smaller than the length of the gap 313. to prevent the wheel 21 from wearing the sleeve 34 and/or the connecting frame 31.

In at least one embodiment, a diameter of the sleeve 34 is the same as a diameter of the connecting shaft 33 or slightly larger than a diameter of the connecting shaft 33.

In at least one embodiment, the diameter of the sleeve 34 is larger than a diameter of the first through hole 3111, to prevent the sleeve 34 from extending into the first through hole 3111.

In the technical solution of the present disclosure, the connecting assembly 30 includes two oppositely arranged sleeves 34, the sleeve 34 is sleeved on the connecting shaft 33 and located between the connecting frame 31 and the wheel 21, so that the gap 313 is defined between the wheel 21 and the connecting frame 31, and the tent assembly 10 can be prevented from getting stuck in the wheels 21, further to increase a service life and a security of the tent trailer 100.

The connecting assembly 30 further includes a connecting rod 32, and the connecting shaft 33 is connected with the connecting rod 32 after passing through the wheel 21 and the first through hole 3111.

In at least one embodiment, in at least one embodiment, a cross section of the connecting rod 32 is circular shaped, oval shaped, polygonal shaped, or irregular shaped.

In at least one embodiment, a plurality of rod bodies (not shown) are connected in sequence to form the connecting rod 32.

In at least one embodiment, two ends of the connecting rod 32 are respectively connected with the two side frames 311.

In at least one embodiment, the connecting rod 32 has a hollow structure, and a through hole (not marked) of the connecting rod 32 is communicated with the first through hole 3111.

In at least one embodiment, the connecting shaft 33 is received in the through hole of the connecting rod 32 after passing through the wheel 21 and the first through hole 3111; or the connecting shaft 33 passes through the wheel 21 and is received in the first through hole 3111, the connecting rod 32 is also received in the first through hole 3111, and the connecting shaft 33 is received in the through hole of the connecting rod 32 which is received in the first through hole 3111.

In the technical solution of the present disclosure, the connecting assembly 30 further includes the connecting rod 32, and the connecting shaft 33 is connected with the connecting rod 32 after passing through the wheel 21 and the first through hole 3111, so that the connecting assembly 30 can be stably connected with the wheel 21.

The connecting shaft 33 defines at least one second through hole 331, the connecting rod 32 defines at least one third through hole 321, and the connecting assembly 30 further includes at least one second connecting member 35. When the connecting shaft 33 extends into the connecting rod 32, the second through hole 331 is communicated with the third through hole 321, and the second connecting member 35 is received in the second through hole 331 and the third through hole 321, to connect the connecting rod 32 with the connecting shaft 33.

In at least one embodiment, the connecting shaft 33 defines a plurality of second through holes 331, the connecting rod 32 defines a plurality of third through holes 321, and the connecting assembly 30 further includes a plurality of second connecting members 35, each second connecting member 35 is received in one corresponding second through hole 331 and one corresponding third through hole 321, to connect the connecting rod 32 with the connecting shaft 33.

In at least one embodiment, one end of the second connecting member 35 is provided with a blocking portion 351, and the blocking portion 351 is limited at a periphery of the third through hole 321.

In at least one embodiment, the second connecting member 35 further includes a fixing portion 352, the fixing portion 352 is sleeved on one end of the second connecting member 35 extending out of the third through hole 321, to prevent the second connecting member 35 from escaping out of the second through hole 331 and the third through hole 321.

In the technical solution of the present disclosure, the connecting shaft 33 defines at least one second through hole 331, the connecting rod 32 defines at least one third through hole 321, and the connecting assembly 30 further includes at least one second connecting member 35. When the connecting shaft 33 passes through the first through hole 3111 and extends into the connecting rod 32, the second through hole 331 is communicated with the third through hole 321, the second connecting member 35 is received in the second through hole 331 and the third through hole 321, to connect the connecting rod 32 and the connecting shaft 33 stably.

The tent assembly 10 includes a tent body 11, a bottom pad 12 connected with the tent body 11, at least one first support frame 13 for supporting the tent body 11, and at least one second support frame 16 for supporting the bottom pad 12. The first support frame 13 is rotatably connected with the second support frame 16, and the second support frame 16 is connected with the connection frame 31. When the tent assembly 10 is in an unfolded state, the first support frame 13 is connected at an angle with the second support frame 16, to support the tent body 11; when the tent assembly 10 is in a folded state, the first support frame 13 is stacked on the second support frame 16. A receiving space 101 is defined between the second support frame 16 and the wheel 21. The first support frame 13 is at least partially arranged between the wheel 21 and the second support frame 16, so the first support frame 13 is at least partially received in the receiving space 101 when folded on the second support frame 16. The receiving space 101 is communicated with the gap 313, and the tent assembly 10 may not get stuck in the wheel 21 when folded. The receiving space 101 is communicated with the gap 313, and the tent assembly 10 may not get stuck in the wheel 21 when folded.

In at least one embodiment, the tent body 11 includes a door 111 and a window 112.

In at least one embodiment, the tent assembly 10 includes at least one support rod 14 and two oppositely arranged first support frames 13, and the support rod 14 is detachably connected with the two oppositely arranged first support frames 13, to support the tent body 11.

In at least one embodiment, the first support frame 13 is U-shaped.

In at least one embodiment, the second support frame 16 is square shaped.

In the technical solution of the present disclosure, the tent assembly 10 includes the tent body 11, the bottom pad 12, the first support frame 13, and the second support frame 16, and the first support frame 13 is rotatably connected with the second support frame 16, and the second support frame 16 is connected with the connecting frame 31. In this way, when the tent assembly 10 is in the unfolded state, the first support frame 13 is connected at an angle with the second support frame 16 to support the tent body 11. When the tent assembly 10 is in the folded state, the first support frame 13 is stacked on the second support frame 16 for storage. Further, the tent assembly 10 can move with the vehicle 200 as the tent assembly 10 is connected with the connecting frame 31.

The second support frame 16 includes a first sub-support frame 161 connected with the connecting frame 31, and a second sub-support frame 162 rotatably connected with the first sub-support frame 161. When the tent assembly 10 is in the unfolded state, the first support frame 13 is connected with an angle with the first sub-support frame 161, and connected with an angle with the second sub-support frame 162, to support the tent body 11; when the assembly 10 is in the folded state, the first support frame 13 and the second sub-support frame 162 are stacked on the first sub-support frame 161.

In at least one embodiment, the second support frame 16 further includes a third sub-support frame 163, and the third sub-support frame 163 is rotatably connected with the second sub-support frame 162, so that the third sub-support frame 163 can be stacked on the second sub-support frame 162.

In at least one embodiment, the first sub-support frame 161 is U-shaped, the second sub-support frame 162 includes two oppositely arranged rods, and the third sub-support frame 163 is U-shaped. When the first sub-support frame 161, the second sub-support frame 162, and the third sub-support frame 163 are connected in sequence, the first sub-support frame 161, the second sub-support frame 162, and the third sub-support frame 163 cooperatively form the square second support frame 16. The first supporting frame 13 and the third sub-supporting frame 163 can be folded on the second sub-supporting frame 162, and the first supporting frame 13, the third sub-supporting frame 163, and the second sub-supporting frame 162 can be further folded on the first sub-support frame 161, so that the tent assembly 10 in the folded state has a smaller volume.

It can be understood that, when the first support frame 13, the second sub-support frame 162 and the third sub-support frame 163 are folded, the tent body 11 supported by the first support frame 13, and the bottom pad 12 connected with the second sub-support frame 162 and the third sub-support frame 163 can be folded simultaneously.

In the technical solution of the present disclosure, the second support frame 16 includes the first sub-support frame 161 connected with the connecting frame 31, and the second sub-support frame 161 rotatably connected with the first sub-support frame 161. When the tent assembly 10 is in the unfolded state, the first support frame 13 is connected with angles with the first sub-support frame 161 and the second sub-support frame 162, to support the tent body 11; when the tent assembly 10 is in the folded state, the first support frame 13 and the second sub-support frame 162 are stacked on the first sub-support frame 161, so that the tent assembly 10 in the folded state has a small volume.

Figure 7:
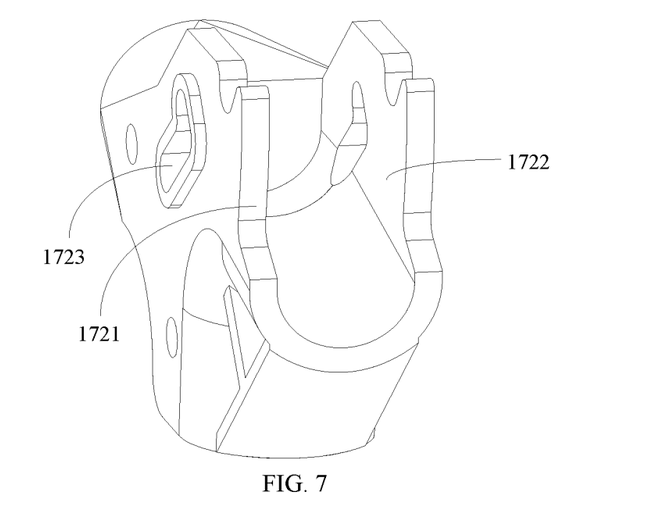
FIG. 7 is a structure diagram of a third connecting member of the tent trailer as shown in FIG. 3.
Figure 8:
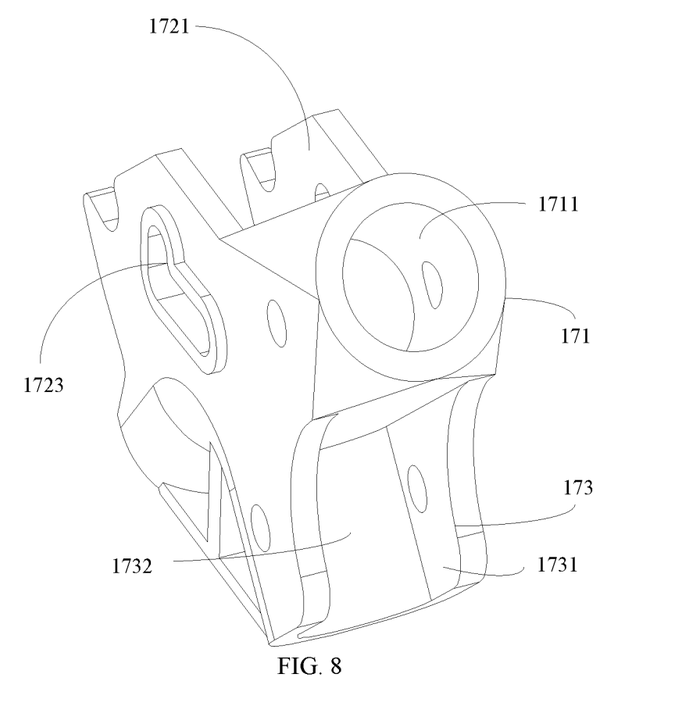
FIG. 8 is another structure diagram of the third connecting member of the tent trailer as shown in FIG. 3.

The tent assembly 10 further includes at least one third connecting member 17, and the first support frame 13 is rotatably connected with the second support frame 16 by the third connecting member 17.

In at least one embodiment, the first support frame 13 includes a bending portion 131, and the bending portion 131 is rotatably connected with an outer wall of the third connecting member 17.

In at least one embodiment, the third connecting member 17 includes a connecting portion 171 and a connecting portion 172, the first sub-support frame 161 can be connected with the connecting portion 171, and the second sub-support portion 162 is rotatably connected with the connecting portion 172. The bending portion 131 is rotatably connected with an outer wall of the connecting portion 172.

In at least one embodiment, the connecting portion 171 defines a receiving hole 1711, and the first sub-support frame 161 is received in the receiving hole 1711.

In at least one embodiment, the connecting portion 172 includes two oppositely arranged side walls 1721, the two oppositely arranged side walls 1721 cooperatively form a receiving groove 1722, and the second sub-support frame 162 is rotatably received in the receiving groove 1722. Each side wall 1721 defines a first opening 1723, the second sub-support frame 162 defines a second opening (not labeled), the bending portion 131 defines a third opening (not labeled), a rotating shaft can pass through the first opening 1723, the second opening and the third opening, and the first supporting frame 13 and the second sub-supporting frame 162 can rotate around the rotating shaft.

In at least one embodiment, the third connecting member 17 further includes a connecting portion 173 spaced apart from the connecting portion 172. The connecting portion 173 has the same or similar structure as the connecting portion 172. The connecting portion 173 includes two opposite side walls 1731, and the two opposite side walls 1731 cooperatively define an accommodating groove 1732, and the leg 15 is rotatably received in the accommodating groove 1732. Each side wall 1731 defines a fourth opening 1733, and the leg 15 defines a fifth opening (not labeled), and a rotating shaft can pass through the fourth opening 1733 and the fifth opening, so that the leg 15 can rotate around the rotating shaft.

It can be understood that, a quantity of the third connecting member 17 can be set according to actual needs.

In at least one embodiment, two ends of the third sub-support frame 163 are rotatably connected with two rod bodies of the second sub-support frame 162 by the third connecting members 17. The two rod bodies of the second sub-support frame 162 are rotatably connected with both ends of the first sub-support frame 161 by the third connecting members 17.

The third sub-support frame 163 can be rotatably connected with the second sub-support frame 162 by another third connecting member 17, and one end of the second sub-support frame 162 away from the first sub-support frame 161 can be received in the receiving hole 1711 of the another third connecting member 17.

In the technical solution of the present disclosure, the tent assembly 10 also includes at least one third connecting member 17, and the first support frame 13 is rotatably connected with second support frame 16 by the third connecting member 17, to facilitate a storage of the tent assembly 10.

The connecting assembly 30 further includes a bending rod 36, one end of the bending rod 36 is connected with the second support frame 16, and another end of the bending rod 36 is connected with the vehicle 200.

In at least one embodiment, the bending rod 36 includes a straight rod 361 and a bending portion 362, and the straight rod 361 is connected with the side frame 311 of the connecting frame 31. The bending portion 362 is bent and extended from an end of the straight rod 361 away from the connecting frame 311 in a direction towards a center of the connecting frame 31.

In at least one embodiment, a projection of a free end of the bending portion 362 is coincident with that of the center of the connecting frame 31. When the bending portion 362 is connected with the vehicle 200, a projection of a center of the vehicle 200 is coincident with that of a center of the tent trailer 100, so that the vehicle 200 can easily drag the tent trailer 100.

In at least one embodiment, the bending rod 36 further includes a connecting portion 363, the connecting portion 363 defines an opening (not labeled), and the connecting portion 363 can be sleeved on an axle (not labeled) of the vehicle 300, a nut 203 can be sleeved on the axle and retained against the connecting portion 363 to connect the bending rod 36 with the axle.

In at least one embodiment, the bending rod 36 further includes a strap 364 which can be connected with a support frame 202 of the vehicle 200. The support frame 202 can be configured for supporting a saddle of vehicle 200.

In the technical solution of the present disclosure, the connecting assembly 30 further includes the bending rod 36, one end of the bending rod 36 is connected with the second support frame 16, and another end of the bending rod 36 is connected with the vehicle 200, so that the vehicle 200 is connected with the tent trailer 100.

The connecting assembly 30 further includes at least one fourth connecting member 37, and the second support frame 16 is connected with the connecting frame 31 by the fourth connecting member 37.

In at least one embodiment, the fourth connecting member 37 includes a bottom wall 371 and two opposite side walls 372, the bottom wall 371 and the side walls 372 cooperatively define a receiving space 373, the first sub-support frame 161 can be received in the receiving space 372 to connect the second support frame 16 with the connecting frame 31.

In at least one embodiment, the fourth connecting member 37 is U-shaped.

In the technical solution of the present disclosure, the connecting assembly 30 further includes at least one fourth connecting member 37, and the second support frame 16 is connected with the connecting frame 31 by the fourth connecting member 37, so that the vehicle 200 can drive the tent assembly 100 to move by the fourth connecting member 37 and the connecting frame 31.

Figure 9:
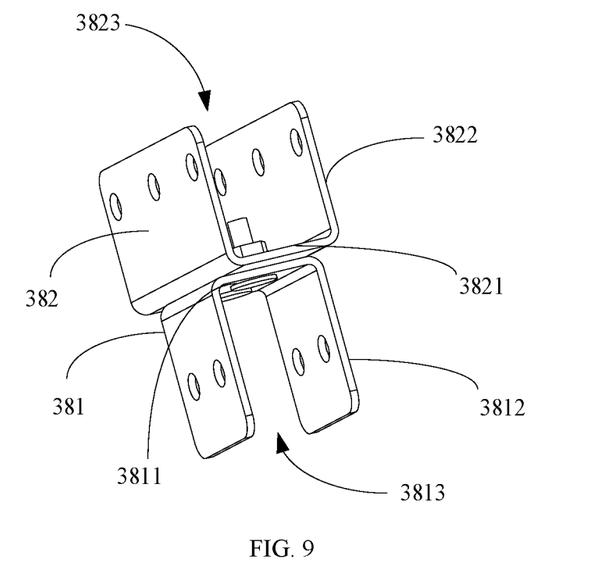
FIG. 9 is a structure diagram of a fifth connecting member of the tent trailer as shown in FIG. 3.

The connecting assembly 30 further includes a fifth connecting member 38, and the fifth connecting member 38 includes a first connecting portion 381 connected with the second support frame 16, and a second connecting portion 382 connected with the first connecting portion 381. The second connecting portion 382 is connected with the bending rod 36 to connect the bending rod 36 with the second support frame 16.

In at least one embodiment, the first connecting portion 381 is connected with the first sub-support frame 161.

In at least one embodiment, the first connecting portion 381 includes a bottom wall 3811 and two opposite side walls 3812, the bottom wall 3811 and the side walls 3812 cooperatively form a receiving space 3813, the first sub-support frame 161 is received in the receiving space 3813.

In at least one embodiment, the second connecting portion 382 is connected with the straight rod 361.

In at least one embodiment, the second connecting portion 382 includes a bottom wall 3821 and two opposite side walls 3822, the bottom wall 3821 and the side walls 3822 cooperatively form a receiving space 3823, the straight rod 361 is received in the receiving space 3823.

In at least one embodiment, a size of the first connecting portion 381 is smaller than a size of the second connecting portion 382, so as to securely connect the tent trailer 100 with the vehicle 200.

In the technical solution of the present disclosure, the connecting assembly 30 also includes the fifth connecting member 38, and the fifth connecting member 38 includes the first connecting portion 381 connected with the second support frame 16, and the second connecting portion 382 connected with the first connecting portion 381, the second connecting portion 382 is connected with the bending rod 36 to connect the bending rod 36 to the second support frame 16, to connect the bending rod 36 with the second support frame 16, further to connect the tent trailer 100 with the vehicle 200.

Figure 10:
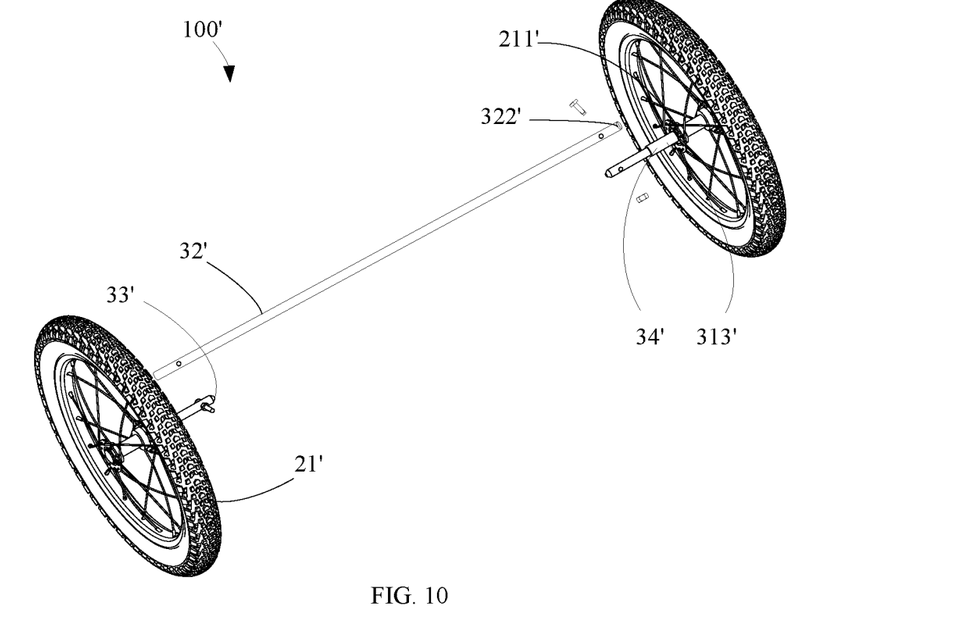
FIG. 10 is a structure diagram of a wheel assembly, and parts of a connecting assembly of a tent trailer according to another embodiment of the present disclosure.

Please referring to FIG. 10, the present disclosure provides a tent trailer 100' according to a second embodiment, and the tent trailer 100' according to the second embodiment is similar in structure to the tent trailer 100 according to the first embodiment. The differences between the two at least include: the first connecting member is a connecting rod 32', and two ends of each connecting shaft 33' are respectively connected with one corresponding wheel 21' and one corresponding side of the connecting rod 32'; each sleeve 34' is sleeved on one corresponding connecting shaft 33' and is located between the connecting rod 32' and the wheel 21', and two end walls of the sleeve 34' are respectively retained against the connecting rod 32' and the wheel 21', so that a gap 313' is defined between the connecting rod 32' and the wheel 21', and the gap 313' is defined along an extending direction of the connecting shaft 33'.

In at least one embodiment, the length of the gap 313' is 2-6 cm. For example, the length of the gap 313' is 2 cm, 3 cm, 4 cm, 5 cm, or 6 cm.

In at least one embodiment, the gap 313' is defined between the hub 211' and the connecting rod 32'.

In at least one embodiment, a plurality of rod bodies (not shown) are connected with to form the connecting rod 32'.

In at least one embodiment, the connecting rod 32' defines a fourth through hole 322', so that the connecting rod 32' has a hollow structure. Or, both ends of the connecting rod 32" define a fourth through hole 322'.

It should be understood that, the connecting shaft 33' is not completely received in the mounting hole of the wheel 21' and the fourth through hole 322' of the connecting rod 32', so the gap 313' can be defined between the wheel 21' and the connecting rod 32' without the sleeve 34'.

In at least one embodiment, In at least one embodiment, a cross section of the connecting rod 32' is circular shaped, oval shaped, polygonal shaped, or irregular shaped.

In at least one embodiment, the connecting rod 12' is connected with the second support frame to support the second support frame.

Figure 1:
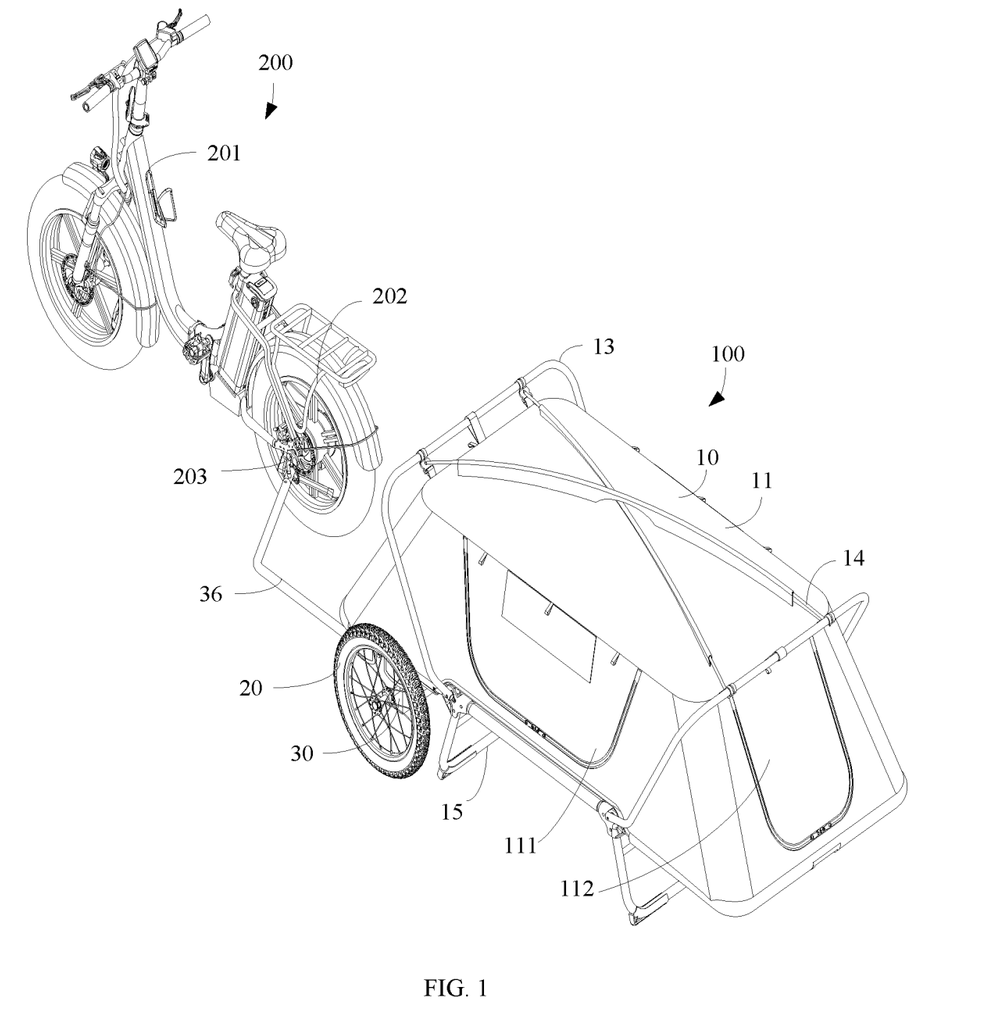
FIG. 1 is a structure diagram of a vehicle according to an embodiment of the present disclosure.
Figure 2:
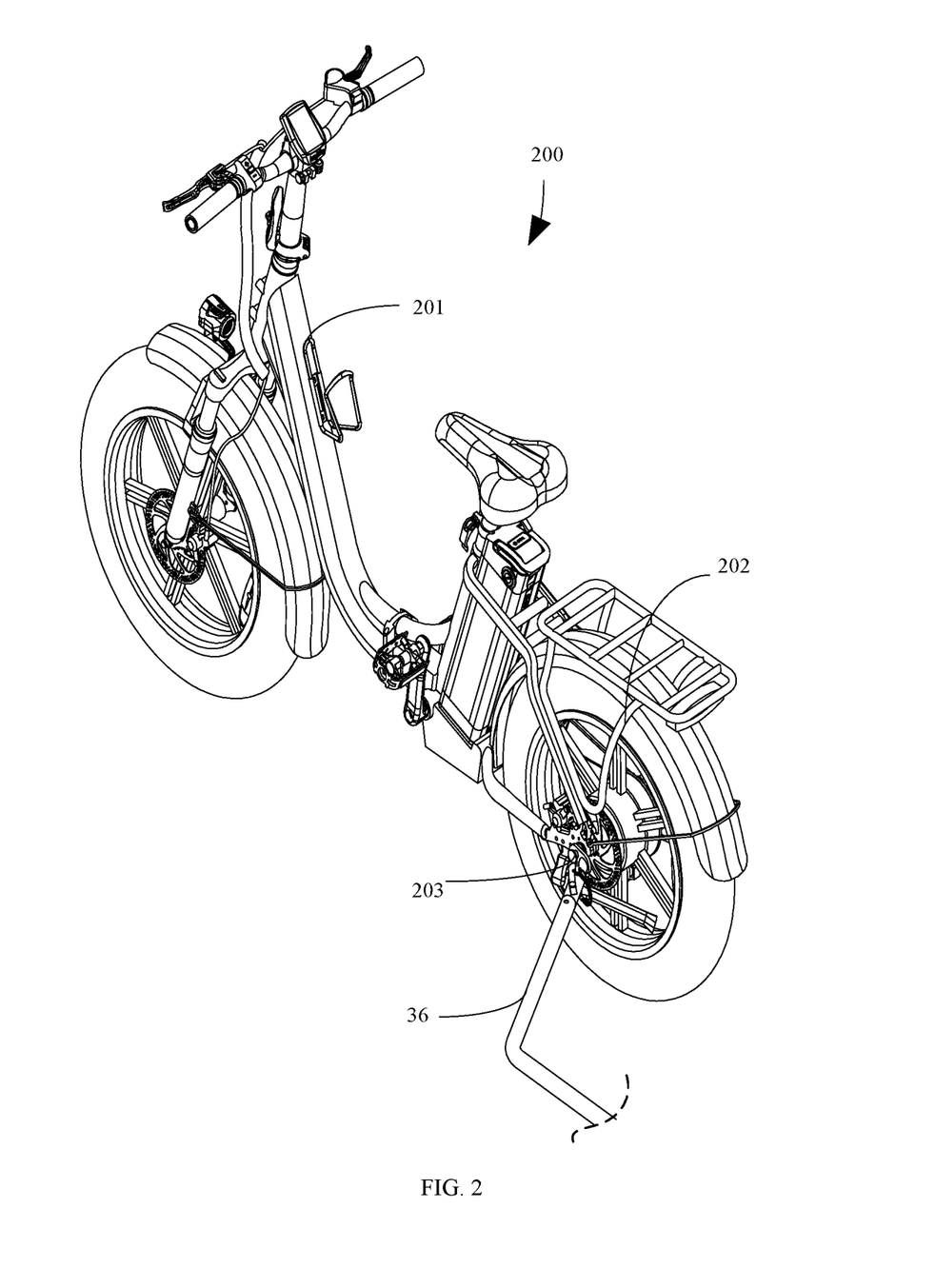
FIG. 2 is a structure diagram of parts of the vehicle in FIG. 1.
Figure 3:
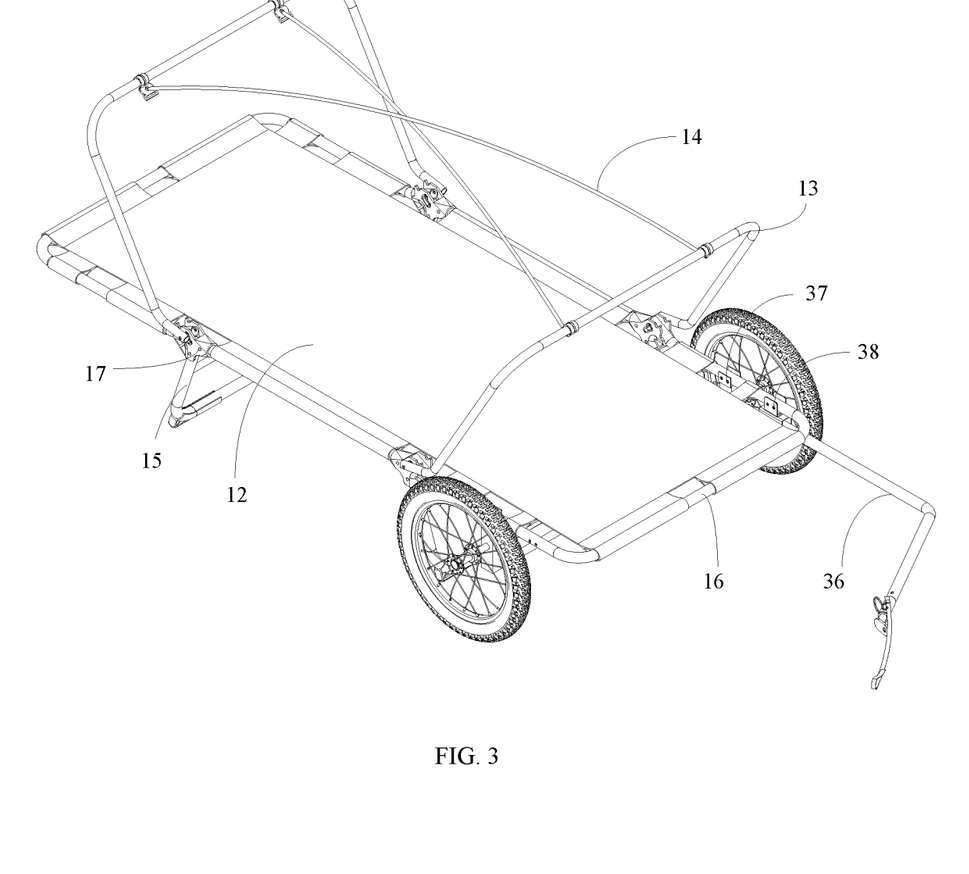
FIG. 3 is a structure diagram of parts of a tent trailer as shown in FIG. 1.
Figure 4:
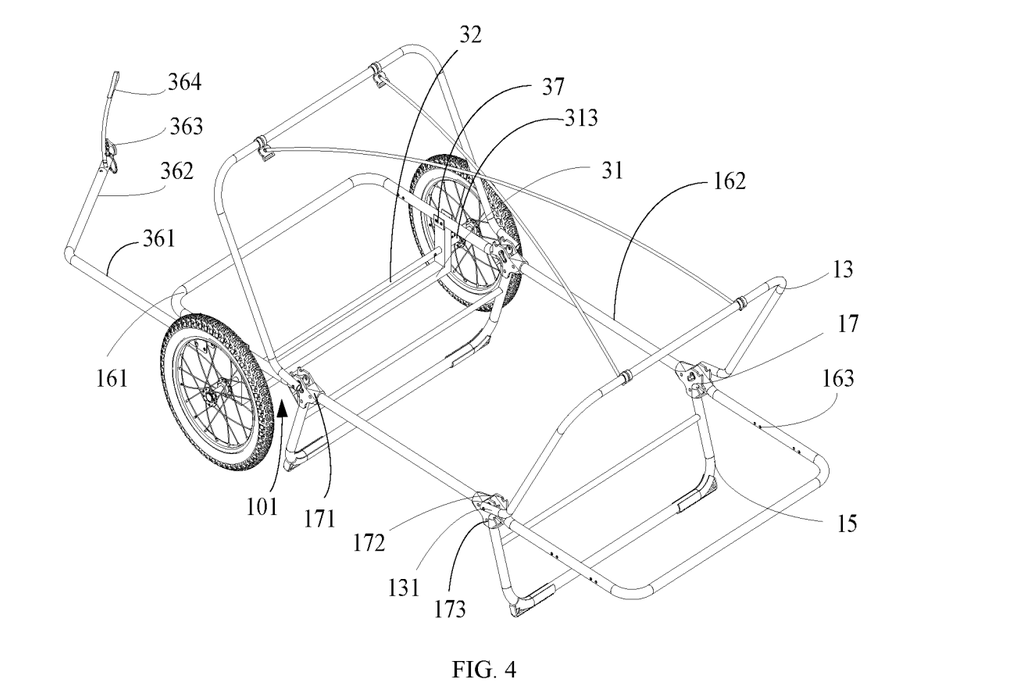
FIG. 4 is a structure diagram of a wheel assembly, a connecting assembly, and parts of a tent assembly as shown in FIG. 1.
Figure 5:
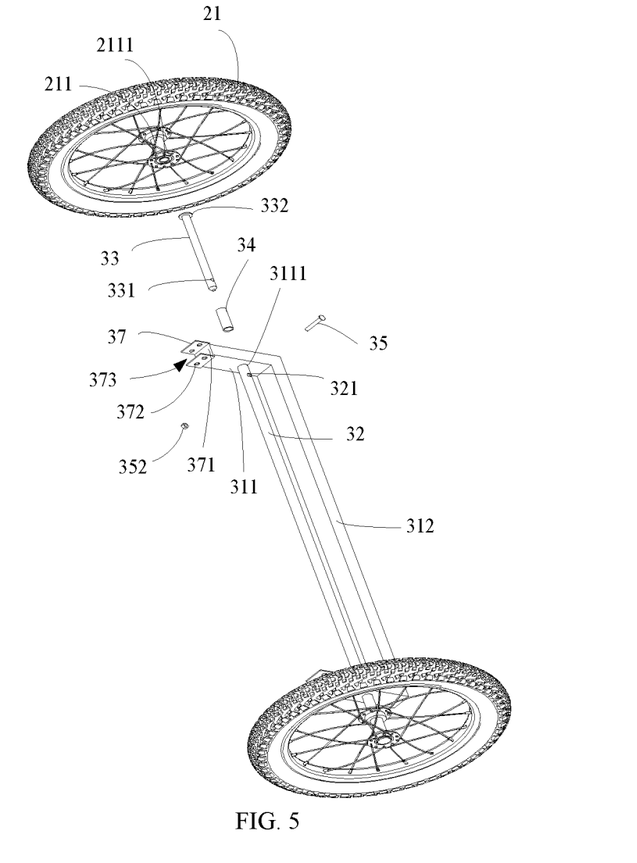
FIG. 5 is an exploded diagram of the wheel assembly, and parts of the connecting assembly as shown in FIG. 1.
Figure 6:
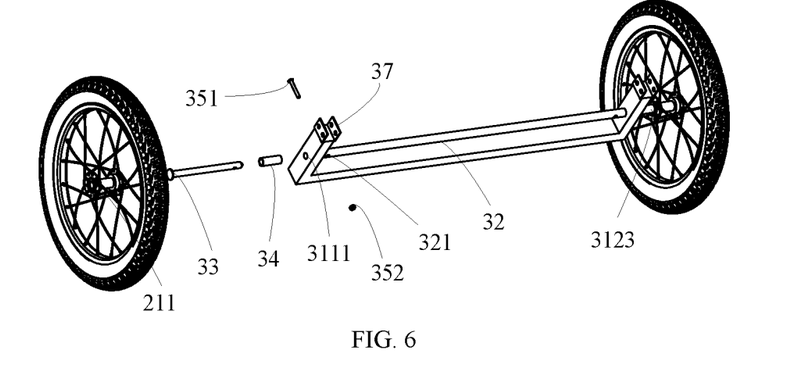
FIG. 6 is another exploded diagram of the wheel assembly, and parts of the connecting assembly as shown in FIG. 1.

Please referring to FIGS. 1-2, the present disclosure further provides a vehicle 200, which includes a vehicle body 201 and the tent trailer 100, and the tent trailer 100 is connected with the vehicle body 201.

In at least one embodiment, the vehicle 200 is a bicycle, a motorbike, a tricycle, or the like. Preferably, the bicycle is an adult bicycle.

It can be understood that, the vehicle 200 may further include the tent trailer 100'.

As the vehicle 200 adopts all the technical proposals of the above exemplary embodiments, the vehicle 200 at least has all of the beneficial effects of the technical proposals of the above exemplary embodiments, no need to repeat again.

The above description is merely some embodiments. It should be noted that for one with ordinary skills in the art, improvements can be made without departing from the concept of the present disclosure, but these improvements shall fall into the protection scope of the present disclosure.

What is claimed is:

1. A tent trailer, capable of being connected with a vehicle to move with the vehicle, wherein the tent trailer comprises:
a tent assembly;
a wheel assembly, comprising two opposite wheels; and
a connecting assembly, the tent assembly is arranged on the connecting assembly, and the connecting assembly comprises:
a first connecting member, arranged between the two opposite wheels and connected with the tent assembly; and
two opposite connecting shafts, two ends of each of the connecting shafts are respectively connected with one corresponding wheel and one corresponding side of the first connecting member, so as to connect the wheels with the first connecting member, and the vehicle is connected with the first connecting member to drive the tent trailer to move, a gap is defined between the wheel and the first connecting member, and extends along an extending direction of the connecting shaft when the tent trailer is in use to prevent the tent assembly from getting stuck in the wheels, wherein
the first connecting member is a connecting rod, and two ends of each of the connecting shafts are respectively connected with one corresponding wheel and one corresponding side of the connecting rod.

2. The tent trailer according to claim 1, wherein the connecting assembly further comprises:
two opposite sleeves, each of the sleeves is sleeved on one corresponding connecting shaft and arranged between the connecting rod and the wheel, and two end walls of each of the sleeves are respectively retained against the connecting rod and the wheel, so as to define the gap between the connecting rod and the wheel, and a length of the gap is about 2-6 cm.

3. The tent trailer according to claim 1, wherein the tent assembly comprises:
a tent body;
a bottom pad, connected with the tent body;
a first support frame, configured for supporting the tent body; and
a second support frame, configured for supporting the bottom pad, the first support frame is rotatably connected with the second support frame, the second support frame is connected with the first connecting member, when the tent assembly is in an unfolded state, the first support frame and the second support frame are connected at an included angle to support the tent body; and when the tent assembly is in a folded state, the first support frame is stacked on the second support frame.

4. The tent trailer according to claim 3, wherein
the second support frame comprises a first sub-support frame connected with the first connecting member, and a second sub-support frame rotatably connected with the first sub-support frame, when the tent assembly is in the unfolded state, the first sub-support frame and the second sub-support frame are connected at an included angle to support the tent body; and
when the tent assembly is in the folded state, the first sub-support frame is stacked on the second sub-support frame; and/or
the tent assembly further comprises at least one third connecting member, and the first support frame is rotatably connected with the second support frame by the third connecting member; and/or
the connecting assembly further comprises at least one fourth connecting member, and the second support frame is connected with the first connecting member by the fourth connecting member; and/or
the connecting assembly further comprises a bending rod, one end of the bending rod is connected with the second support frame, and another end of the bending rod is connected with the vehicle.

5. A tent trailer, capable of being connected with a vehicle to move with the vehicle, wherein the tent trailer comprises:
a tent assembly, comprising:
a tent body;
a bottom pad, connected with the tent body;
a first support frame, configured for supporting the tent body; and
a second support frame, configured for supporting the bottom pad, the first support frame is rotatably connected with the second support frame;
a wheel assembly, comprising two opposite wheels; and
a connecting assembly, the tent assembly is arranged on the connecting assembly, and the connecting assembly comprises:
a first connecting member, arranged between the two opposite wheels, the second support frame is arranged on and connected with the first connecting member; and
two opposite connecting shafts, two ends of each of the connecting shafts are respectively connected with one corresponding wheel and one corresponding side of the first connecting member, so as to connect the wheels with the first connecting member, and the first connecting member is connected with the vehicle, thus the vehicle is capable of driving the tent trailer to move, wherein
a receiving space is defined between the second support frame and the wheel, the first support frame is at least partially received in the receiving space when folded on the second support frame.

6. The tent trailer according to claim 5, wherein the connecting assembly further comprises:
two opposite sleeves, each of the sleeves is sleeved on one corresponding connecting shaft and arranged between the connecting frame and the wheel.

7. The tent trailer according to claim 5, wherein
the first connecting member comprises:
two opposite side frames, two ends of each of the connecting shafts are respectively connected with one corresponding wheel and one corresponding side frame;
the connecting assembly further comprises:
a connecting rod, two ends of the connecting rod are respectively connected with the two opposite side frames, the side frame defines a first through hole, and the connecting shaft is connected with the connecting rod after passing through the wheel and the first through hole; and
at least one second connecting member; wherein
the connecting shaft defines at least one second through hole;
the connecting rod defines at least one third through hole; and
the second through hole is communicated with the third through hole when the connecting shaft passes through the first through hole and inserted into the connecting rod, and the second connecting member is received in the second through hole and the third through hole, to connect the connecting rod with the connecting shaft.

8. The tent trailer according to claim 5, wherein the second support frame comprises:
   a first sub-support frame, connected with the first connecting member; and
   a second sub-support frame, rotatably connected with the first sub-support frame, when the tent assembly is in an unfolded state, the first sub-support frame and the second sub-support frame are connected at an included angle to support the tent body; and when the tent assembly is in a folded state, the first sub-support frame is stacked on the second sub-support frame.

9. The tent trailer according to claim 5, wherein the tent assembly further comprises:
   at least one third connecting member, the first support frame is rotatably connected with the second support frame by the third connecting member.

10. The tent trailer according to claim 5, wherein the connecting assembly further comprises
   at least one fourth connecting member, and the second support frame is connected with the first connecting member by the fourth connecting member.

11. The tent trailer according to claim 5, wherein the tent assembly further comprises:
   at least one foldable leg, a height of the at least one foldable leg is not less than a radius of the wheel.

12. The tent trailer according to claim 5, wherein the wheel comprises:
   a hub, defining a mounting hole, one end of the connecting shaft is provided with a blocking member, the blocking member is limited at a periphery of the mounting hole after the connecting shaft passes through the mounting hole.

13. The tent trailer according to claim 5, wherein
   the tent assembly further comprises at least one support rod; and
   a quantity of the first support frame is two, and the two first support frames are oppositely arranged, and the at least one support rod is detachably connected with the two oppositely arranged first support frames, to support the tent body.

14. A vehicle, comprising a vehicle body and a tent trailer according to claim 5, wherein the tent trailer is connected with the vehicle body.

* * * * *